United States Patent [19]
Derain

[11] 3,819,075
[45] June 25, 1974

[54] DEVICE FOR LOADING A SKIP ON TO A VEHICLE
[75] Inventor: Christian Derain, Saint Aubin Le Vieil Evreux, France
[73] Assignee: Societe Nouvelle des Bennes Saphem, La Neuve-Lyre, Eure, France
[22] Filed: July 19, 1973
[21] Appl. No.: 380,814

Related U.S. Application Data
[63] Continuation-in-part of Ser. No. 180,761, Sept. 15, 1971, abandoned.

[30] Foreign Application Priority Data
Oct. 1, 1970  France .............................. 70.35574

[52] U.S. Cl............. 214/505, 214/77 R, 214/146.5, 214/515
[51] Int. Cl............................................. B60p 1/28
[58] Field of Search ........... 214/505, 515, 516, 517, 214/501, 77 R, 146.5

[56] References Cited
UNITED STATES PATENTS
2,308,648   1/1943   DeVry et al. ...................... 214/146.5
3,067,966   12/1962   Hicks ................................. 214/77 R Primary Examiner—Albert J. Makay
Attorney, Agent, or Firm—Karl W. Flocks

[57] ABSTRACT

The device comprises a false chassis articulated about a first transverse axis at the rear part of the vehicle chassis and slidably supporting a L-shaped member which in turn supports a container. Said false chassis also comprises an articulation about a second transverse axis. Both slide and false chassis are moved by means of respective jacks. Rotation of the whole of said false chassis about said first axis provides a tipping wagon while sliding actuation of L-shaped member followed by rotation of the articulated portion of said false chassis about said second axis allows said container to be loaded or unloaded from said vehicle.

6 Claims, 7 Drawing Figures

Device for Loading a Skip on to a Vehicle

This is a continuation-in-part of U.S. Pat. application, Ser. No. 180,761 filed Sept. 15, 1971 and now abandoned.

The present invention relates to a device permitting the loading and the unloading of a container on to a vehicle, together with the utilization of said vehicle and container like an ordinary tipping waggon.

The known devices for loading, unloading and tipping containers associated with vehicles are essentially constituted by a rigid tipping frame which is provided with cables or racks sliding in the longitudinal direction by means of hydraulic motors or cylinders. Thus the loading operation comprises:

hooking said cable or rack at the lower end of the container and sloping said frame backwards;

lifting said container onto said frame by means of said cable or rack;

lowering said frame while lifting said container thereon.

The unloading of the container onto the ground is effected under the effect of gravity while retaining said container by means of said cable or rack.

Such devices present numerous drawbacks the main of which are as follows:

difficult handling of the cables which are often damaged due to the low winding radius;

necessity of placing the vehicle quite straight with respect to the container;

skill of the operator in order to act together on the vehicle, the frame and the winding of the cables;

fragility of the mechanical elements due to the requirements of low space consumming and the heavy loads to be moved;

difficulty of hooking cables or a rack on the front portion of the container owing to the possible sinking of same.

The device according to the invention overcomes these drawbacks in providing the following advantages:

automatic hooking of the container by back motion of the vehicle;

possibility of loading-unloading containers while same and the vehicle are not along quite a straight line each other;

simplified handling owing to the motion of a sole element of the device;

rigid binding between the device and the container;

Strength of the device due to said rigid binding.

According to the present invention, the device comprises:

a container having hook attaching means on at least one end thereof;

a false chassis means slidably supporting said container between a forward position and a backward position;

a first pivotal means having a first transverse axis of rotation and connecting said false chassis means to the chassis of the vehicle at the rear end thereof and allowing a limited rotation of said false chassis means about said first pivotal means;

Said false chassis having a rear part the end of which is pivotably mounted about said first pivotal means and a front part forming at least one slide, said rear part and front part of said false chassis being linked together by a second pivotal means having a second transverse axis of articulation;

Said false chassis further including:

an L-shaped member having an upstanding arm for location adjacent the front of said container and having means at its upper end to hook to said attaching means of said container and a horizontal arm slidably engaged in said slide;

locking studs fixed to said rear part of said false chassis and co-operating with lugs located under the bottom of said container;

means to slide said L-shaped member and means to rotate said false chassis, said means being respectively constituted by a first and a second jack.

When the container is loaded on the vehicle, two functions of the device are possible:

a. in order to unload said container onto the ground, the first jack causes the L-shaped member to slide backwards thus carrying with it the container which becomes unlocked with respect to the slide, then the second jack causes said slide to rotate about said second axis whereby the upper end of said L-shaped member describes an arc of a circle, thereby unloading said container from the vehicle. In order to load the container onto the vehicle, the operations in reverse are carried out.

b. in order to utilize the vehicle and container like an ordinary tipping waggon, said first jack is not actuated, thus the container remains locked on said slide and said second jack causes said false chassis to rotate about said first pivotal axis.

The movement of the container is further facilitated by providing one or more rollers at the rear of the vehicle chassis.

Other characteristic features, advantages and particularities of the invention will further be brought out in the description which follows below, reference being made to the accompanying drawings which show, by way of indication and not in any limitative sense, one form of embodiment of the invention.

Figure 1:
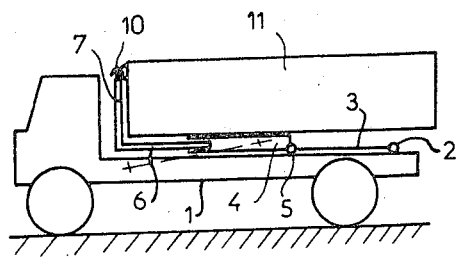
FIGS. 1 to 4 show diagrammatically a vehicle equipped with the device according to the invention, during the course of the various phases of unloading of a container.

According to the drawings, on the chassis 1 of the vehicle is articuled a false chassis around a first transverse axis 2 located at the rear end of said vehicle chassis 1. Said false chassis comprises a rear portion 3 and a front portion 4 which are articulated by means of a second transverse axis 5. Said front portion 4 constitutes two slides adapted to slidably receive the horizontal arm 6 of an L-shaped member having an upstanding arm 7. On each slide is articulated the piston of a jack 8 fixed to the chassis 1, so that said portion 4 rotate about axis 5. Said false chassis further comprises a jack 9 the piston of which is fixed at the lower part of arm 7 of said L-shaped member so that arm 6 slide in slides 4.

An automatic hook 10, known per se, is fixed to the upper end of said arm 7 in order to hook at the upper part of the front portion of a container 11.

Figure 6:
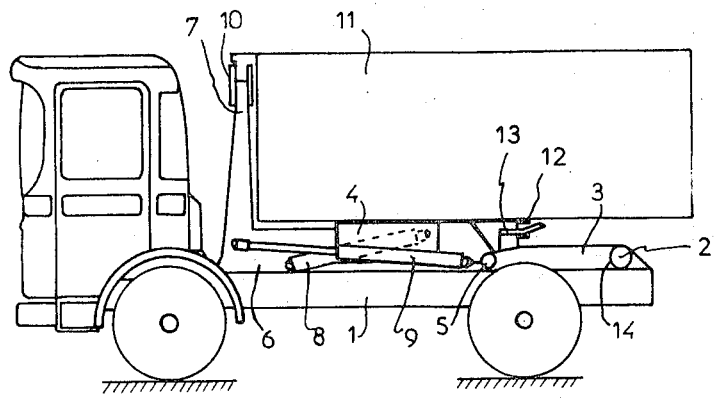
FIGS. 6 and 7 show to a large scale the mechanical parts of the device, FIG. 6 being a view in elevation and FIG. 7 a view from above.
Figure 7:
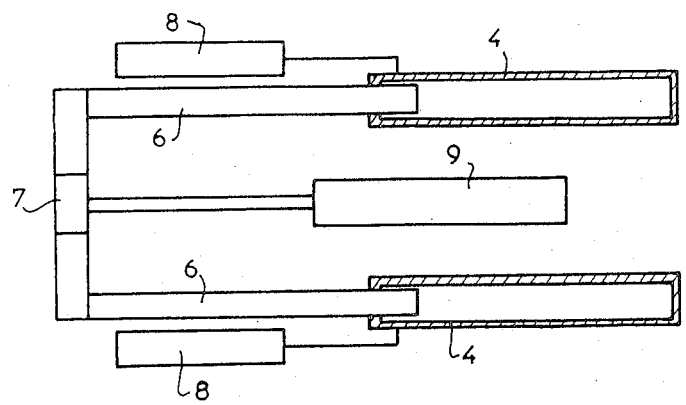

The operation of the device is as follows:

It is assumed that container 11 is initially fixed on the chassis 1 of the vehicle. The various parts of the mechanism then occupy the positions shown in FIGS. 1, 6 and 7 and lugs 12 provided under the bottom of said container co-operate with studs 13 provided on the slides 4 in order to lock it on said slides.

Figure 5:
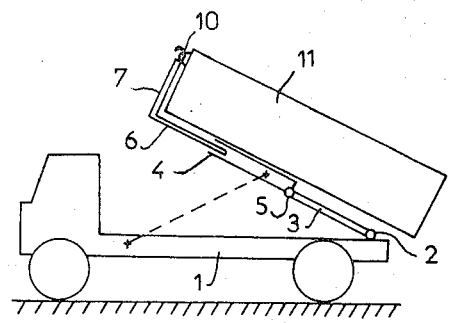
FIG. 5 shows the vehicle acting like a tipping waggon.

In this position, and referring to FIG. 5, operation of the jack 8 causes the vehicle to function as a tipping waggon since the whole of the false chassis, together with the container, rotate about axis 2 while the tipping movement of said container is facilitated by one or more rollers 14 at the rear of the vehicle chassis, which rollers being possibly fitted at each end of said axis 2.

Figure 2:
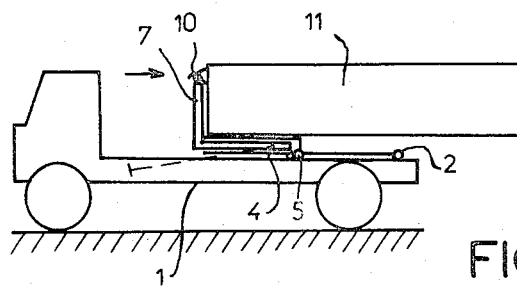

If it is desired to unload the container onto the ground, the jack 9 is first actuated, which has the effect of causing the L-shaped member (6-7) to slide backwards carrying said container with it (this latter taking up the position shown in FIG. 2) the lugs 12 being then desengaged from the studs 13.

Figure 4:
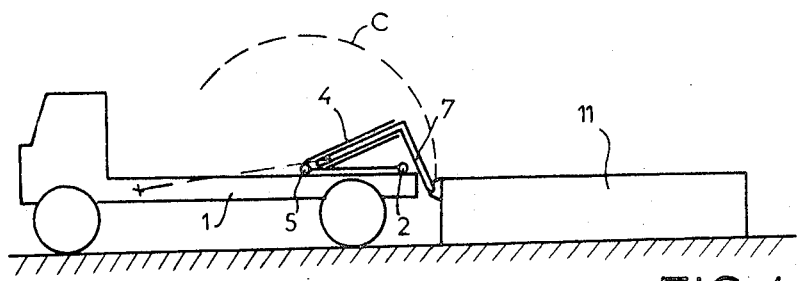

The actuation of the jack 8 now causes rotation of the slides 4 about their point of articulation or axis 5, said slides in their movement displacing the L-shaped member which lifts the container through the hook 10. The rear portion of the container is then supported on the ground; at the end of the tipping movement of the L-shaped member, the container rests wholly on the ground as shown in FIG. 4. As soon as the rear of the container rests on the ground, the tipping movement of the L-shaped member causes a displacement of the vehicle on the ground so that the container runs no risk of being damaged.

Figure 3:
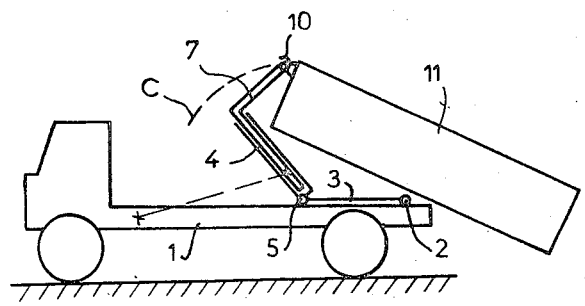

During this tipping movement, the upper end of arm 7 describes an arc of a circle C (FIGS. 3-4) about axis 5. It will be noted that the sliding movement of the L-shaped member in slides 4 makes it possible to reduce the distance between said point of articulation 5 and the hooking means 10, i.e. the radius of said circle C, which limits the space-consumming in tipping the container during unloading or loading operations.

According to an advantageous feature, the angle between arms 6 and 7 of the L-shaped member may be fixed or adjustable by means of an appropriate adjusting device (not shown) in order to adapt said L-shaped member to any form of the front portion of a container.

It will of course be understood that the present invention has been described above purely by way of example and that modifications of detail can be made without departing from the scope of the invention.

I claim:

1. A device for loading-unloading a container from a vehicle and further permitting the utilization of said vehicle as a tipping waggon, comprising:
   a container having hook attaching means on at least one end thereof;
   a false chassis means slidably supporting said container between a forward position and a backward position;
   a first pivotal means having a first transverse axis of rotation and connecting said false chassis means to the chassis of the vehicle at the rear end thereof and allowing a limited rotation of said false chassis means about said first pivotal means;
   said false chassis having a rear part the end of which is pivotably mounted about said first pivotal means and a front part forming at least one slide, said rear part and front part of said false chassis being linked together by a second pivotal means having a second transverse axis of articulation;
   said false chassis further including:
   an L-shaped member having an upstanding arm for location adjacent the front of said container and having means at its upper end to hook to said attaching means of said container and a horizontal arm slidably engaged in said slide;
   locking studs fixed to said rear part of said false chassis and co-operating with lugs located under the bottom of said container;
   means to slide said L-shaped member and means to rotate said false chassis.

2. A device in accordance with claim 1, in which said means to slide said L-shaped member and to rotate said false chassis are respectively first and second jacks.

3. A device in accordance with claim 1, in which said container is locked on said rear portion of said false chassis by means of said lugs and studs when said L-shaped member is in the forward position with respect to said slide, said device acting as a tipping waggon by actuation of said second jack and rotation of said false chassis about said first transverse axis.

4. A device in accordance with claim 1, in which said container is disengaged from said rear portion of said false chassis when said L-shaped member is in the backward position with respect to said slides thus permitting said container to be loaded and unloaded with respect to said vehicle.

5. A device in accordance with claim 1, in which the angle between the two arms of said L-shaped member is adjustable in order to adapt same to any form of the front end of a container.

6. A device in accordance with claim 1, in which the rear portion of the vehicle chassis is provided with rollers intended to facilitate the movement of said container.

* * * * *